Dec. 8, 1953   R. C. HUDSON   2,661,982
SPRAYER
Filed Feb. 25, 1949   2 Sheets-Sheet 1
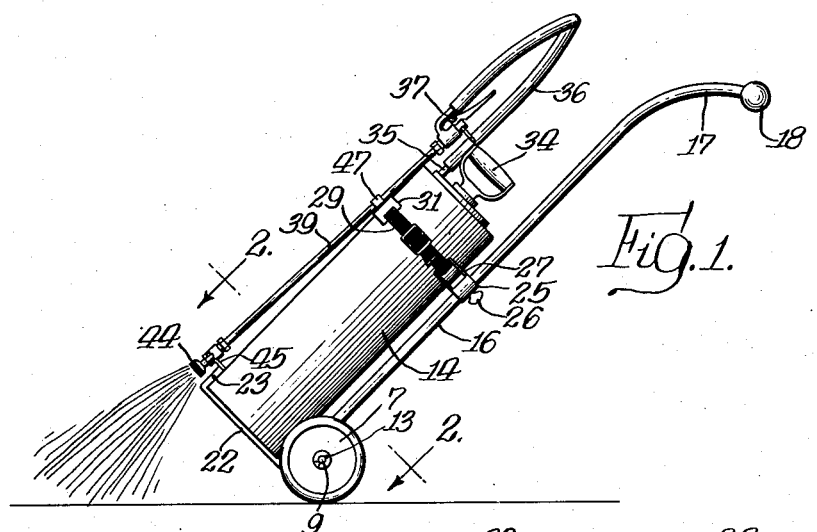
Fig.1.
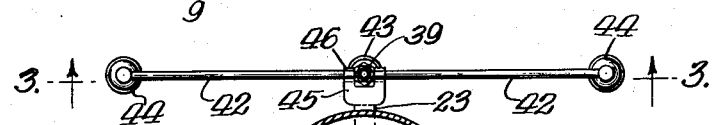
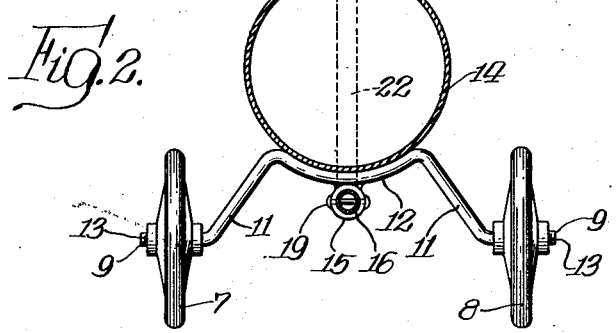
Fig.2.
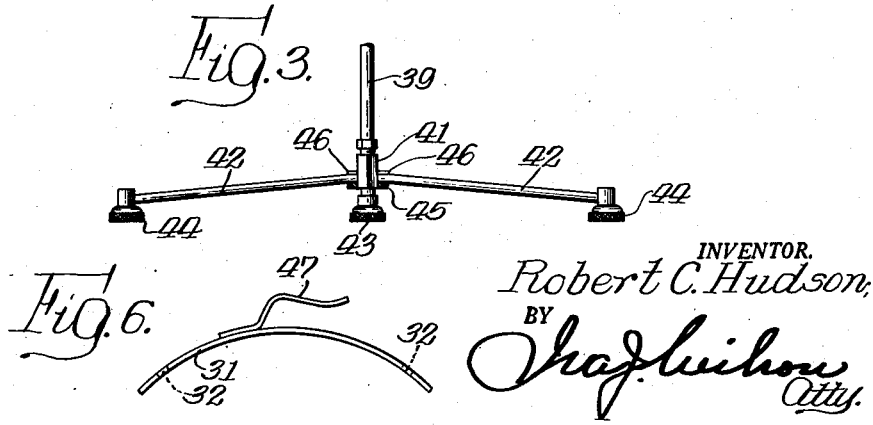
Fig.3.
Fig.6.
INVENTOR.
Robert C. Hudson,
BY

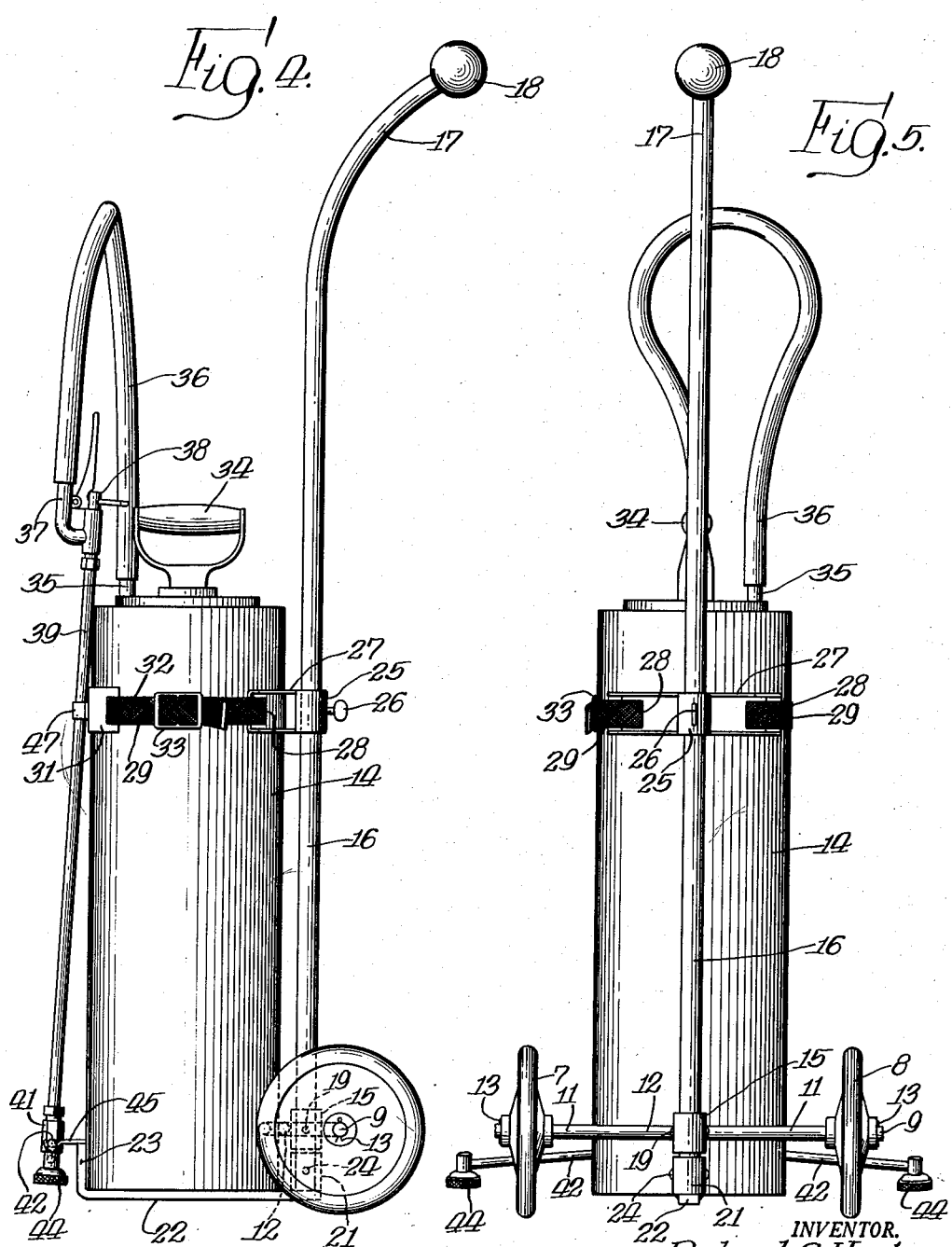

Patented Dec. 8, 1953

2,661,982

UNITED STATES PATENT OFFICE 2,661,982

SPRAYER

Robert C. Hudson, Glencoe, Ill., assignor to H. D. Hudson Manufacturing Company, Chicago, Ill., a corporation of Minnesota Application February 25, 1949, Serial No. 78,395

5 Claims. (Cl. 299—43)

The invention hereof relates to wheeled sprayers, primarily adapted for spraying chemicals, such as 2-4-D, over lawns, yards and other areas which may be too large to permit spraying to be done easily or economically by ordinary hand or back-pack sprayers and too small to warrant the employment of the usual large, vehicle-mounted sprayers.

One of the primary objectives of the invention is to provide an inexpensive and light but sturdy wheeled sprayer so constructed and arranged as to be easy and economical to manufacture, assemble and disassemble and to use, and one which well will serve the purposes of a sprayer of chemicals for the usual home lawns and yards, yet one which may be utilized for spraying other objectives such as trees, shrubs, walls, etc.

Another important objective is to provide a simplified construction for a wheeled vehicle whereby to effect economy and ease of manufacture, whether such vehicle be used for the purpose of conveying a spray tank and its appurtenances or for other objects.

Still another object is to provide a wheeled sprayer so constructed and arranged that a chemical spray such as 2-4-D used for killing weeds, may be applied relatively rapidly and efficiently over and along a wide path and very close to the ground or the plants to be sprayed while the operator is walking along drawing the sprayer behind him. In this connection the arrangement is such that the operator walks ahead of the sprayer and remains out of the spray or spray vapor which is so directed that the spray cloud is maintained close to the ground or surface to be treated and is there distributed in an even and efficient manner over the desired path of application, even when windy and uneven ground conditions prevail.

Many other objects as well as the uses and advantages of the invention will be apparent after reading the following description and claims and after viewing the drawings of the presently preferred embodiment in which:

Fig. 1 is a side elevational view of the sprayer shown in the position in which it normally would assume being drawn over a lawn or other surface;

Fig. 2 is a sectional view taken substantially along the line 2—2 of Fig. 1;

Fig. 3 is a sectional view taken substantially along the line 3—3 of Fig. 2, portions being broken away;

Fig. 4 is a large scale view in side elevation showing certain details of construction;

Fig. 5 is a view on the scale of that of Fig. 4, looking at the sprayer from what may be termed its front, and Fig. 6 is a detail view in top plan of the friction clip by which the spray tube is held at its upper end when the sprayer is used for lawn spraying or similar purposes.

A pair of wheels 7 and 8 are rotatably mounted upon spindles 9 forming the opposite ends of an M-shaped axle, the legs of the M being indicated at 11 and the center portion at 12 in Figs. 2 and 5. Cotter keys 13 or any other suitable securing means may be used to hold the wheels in place on the spindles. The shaping of the axle is important for various reasons and may be done either by bending a piece of bar stock or by forging the same. The center portion 12 preferably is formed in an arc of a radius conforming to the radius of a cylindrical spray tank 14 for which it is to serve as a saddle support, and it is also preferred that the bending or forging of the axle into its shape be so done that all portions of the axle lie in the same plane, as is apparent from Fig. 5; however, other arrangements may be devised as will be appreciated.

Welded or otherwise rigidly secured to the center of the axle portion 12 is a ring boss 15 which forms a cylindrical sleeve or ferrule for the reception of an upwardly extending rod 16 which at its upper end may be bent forwardly at an angle as indicated at 17 and equipped with a hand knob or the like 18. In the interests of lightness the rod 16 may be made from aluminum or an aluminum alloy tubing and a bolt or pin 19 extending through registering apertures in the boss 15 and the rod 16 may serve to hold the rod in fixed position within the boss 15 both as respects relative rotation and longitudinal movement. The rod 16 is of a length sufficient to extend below the boss 15 and to the bottom of a sleeve 21 integral with one end of a supporting arm 22, the other end of which is bent upwardly as indicated at 23. A bolt or pin 24 passing through registering apertures in the sleeve 21 and lower end of rod 16 secures the arm fixedly to the end of the rod after the manner in which the rod is secured in the ring ferrule 15.

Preferably the vertical distance between the inside surface of the upwardly projecting end portion 23 of the arm 22 and the correspondingly opposed surface of the saddle portion 12 of the axle is such as fairly snugly to receive the lower end of the pressure tank 14 with the bottom of the latter resting on the upper face of arm 22 between the sleeve 21 and the upwardly projecting arm portion 23. Adjustably mounted on the rod 16 in spaced relation to and above the axle is a sleeve 25 adapted to be held, by a wing thumb screw 26, in any position to which adjusted. A saddle member 27 having an arcuate face conforming to the contour of the tank 14 is welded or otherwise rigidly secured to the sleeve 25 and may be provided with vertically extending slots 28 for the reception of a strap 29 threaded therethrough. A saddle plate 31 arcuately shaped to conform to the tank contour is provided with slots 32, one adjacent to each end (one only shown), through which the strap 29 is also threaded and secured as by any suitable means such as buckle 33. In this manner the pressure tank 14 is easily disposed on its wheeled carriage and may be quickly and readily secured in position as well as readily released for removal.

The pressure tank illustrated is adapted to carry the necessary liquid spray under pressure generated within the tank by an air pressure pump, the handle of which is shown at 34. This pump and the tank may be similar to that shown and described in Oys et al., Patent No. 2,180,606 of November 21, 1939, or that shown and described in DeFrees Patent No. 2,282,172 of May 5, 1942, but since the construction of the pump and tank are not particularly pertinent to the invention hereof they will not be further described except to state that a liquid outlet nipple 35 conveys the spray liquid from the bottom of the tank to a hose or piece of flexible tubing 36. The tubing 36 may be telescoped over the nipple 35 and may be clamped thereto by a suitable hose clamp as will be understood. At its other end the flexible tubing is similarly telescoped over a nipple 37 which is connected with a valve and valve operating mechanism generally designated 38, the construction and operation of which may be those disclosed in Mayer Patent No. 2,208,850 of July 23, 1940. Connected to the outlet of the valve mechanism 38 is a rigid spray tube 39 of a length sufficient to permit it to extend substantially from end to end of the tank 14 after the manner illustrated in the drawings. At its lower or outer end the spray tube 39 is equipped with a cross-fitting 41 to which laterally extending spray tubes 42 are connected, one at each side and on the end of which is a spray head 43 including a spray nozzle. Each of spray tubes 42 carries a spray head 44 providing a spray nozzle.

Since the spray should be applied uniformly over the area desired to be sprayed and uniformity is difficult to attain under windy and uneven ground conditions and the like, it is desirable to have the spray emitted from the nozzles at a place or places close to the surface or area to be sprayed. To this end the spray tube and spray heads are arranged to be held in relatively fixed position with respect to the vehicle, preferably with the axes of the spray tube 39 and the spray heads inclined downwardly and outwardly from the axis of the tank. The upwardly projecting portion 23 of arm 22 terminates in an outwardly extending portion 45, the outer end of which is forked to provide curved tines 46 adapted to straddle the fitting 41 and provide rests at each side of such fitting for reception of the laterally extending spray tubes 42. In this manner the spray heads 43 and 44 are disposed in a line extending transversely of the path of movement of the vehicle and are so held against accidental displacement. In order to hold the upper end of the tube in position and to aid in retaining the spray heads firmly positioned by the forked end of projection 45 the saddle plate 31 which may be constructed as a sheet metal stamping, has a stamped out center portion providing a spring-like clip 47 adapted to receive the upper portion of the spray tube therebehind and to hold the tube resiliently and releasably in position.

In use, with the valve 38 closed, the operator will place the contents of the tank 14 under pressure by operating the pump through reciprocation of handle 34. When sufficient pressure is placed upon the tank the valve 38 is opened and the operator walking ahead pulls the vehicle behind him by grasping the handle 18. The normal position of drawing the vehicle along the ground is illustrated in Fig. 1. If the spray issuing from the nozzles in the spray heads slows or fails to "fog" in the manner desired due to lack of tank pressure, the operator merely cuts off the valve 38 and again pumps up the pressure in the tank. If it is desired to spray trees or shrubs or to use the sprayer apart from the vehicle chassis, it is a simple matter to detach the pressure tank and spray tube with nozzles from the chassis and to sling it upon one's back or over one's shoulder and to use the sprayer by hand manipulation, all as will be understood.

While the embodiment illustrated is the presently preferred form of the invention, many changes and variations may be made therein and other embodiments may be devised without departing from the invention spirit and the scope of the appended claims.

I claim:

1. In a wheeled sprayer of the character described, a relatively fixed axle consisting of an integral and continuous member shaped to provide a wheel spindle at each end and an intermediate portion of substantially M-shape with the central part concaved to provide a tank saddle, an upwardly extending rod having a handle portion at its upper end and connected adjacent to its lower end with said axle substantially centrally of the saddle, an arm having one end secured to and its other end projecting outwardly away from said lower end of said rod substantially at right angles to said spindles and to said rod and below said saddle, the outer end of said arm having an upwardly directed portion terminating in a forked part having curved tines, a second concaved tank saddle carried by said rod at a place spaced above said axle, said saddles being oriented in the same direction, and a cylindrical spray tank supported on said arm between said upwardly projecting portion and said axle saddle and resting in the concavity of said saddles with the tank axis extending substantially parallel to said rod, the concavities of said saddles conforming substantially to the respective portions of the tank resting thereagainst to hold the tank in rigid position for spraying.

2. In a wheeled sprayer of the character described, an integral length of bar stock formed to provide a wheel axle having end portions adapted to receive wheels rotatably mounted thereon and having a saddle-shaped and arcuate portion intermediate of said end portions with said end portions and arcuate portion of said axle lying in substantially the same plane, an upwardly projecting rod including a handle for manual manipulation of the sprayer, a collar for securing said handle to said axle, a U-shaped part having one end secured relative to said axle and handle and its base projecting substantially at right angles to said rod below and substantially centrally of said saddle-shaped portion, the outer end of said part providing an upwardly projecting portion and terminating in an outwardly projecting portion having curved tines, a saddle member secured to said rod above and in spaced relation to said axle, and a substantially cylindrical tank supported at one end upon said U-shaped part and between said saddle-shaped portion of the axle and said upwardly projecting portion of said part and resting in said saddle-shaped portion and said saddle member.

3. In a wheeled sprayer of the character described, a wheel axle having end portions adapted to receive wheels rotatably mounted thereon and having a saddle-shaped portion intermediate of said end portions, an upwardly projecting rod including a handle for manual manipulation of the sprayer, means for securing said handle to said axle, an arm secured relative to said axle and handle and projecting, substantially at right angles to said rod below and substantially centrally of said saddle-shaped portion, the outer end of said arm having an upwardly projecting portion terminating in a forked end having upwardly inclined tines, a saddle member secured to said rod above and in spaced relation to said axle and oriented in the same direction as respects said saddle-shaped portion, a substantially cylindrical tank supported at one end upon said arm and between said saddle-shaped portion of the axle and said upwardly projecting portion of said arm and resting in said saddle-shaped portion and said saddle member, and a spray head releasably carried by said forked end of said arm and having communication with said tank.

4. In a wheeled sprayer of the character described, a wheel axle having end portions adapted to receive wheels rotatably mounted thereon and having a saddle-shaped portion intermediate of said end portions, an upwardly projecting rod including a handle for manual manipulation of the sprayer, means for securing said handle to said axle, an arm secured relative to said axle and handle and projecting, substantially at right angles to said rod below and substantially centrally of said saddle-shaped portion, the outer end of said arm having an upwardly projecting portion terminating in a forked end having upwardly curved tines, a saddle member secured to said rod above and in spaced relation to said axle and oriented in the same direction as respects said saddle-shaped portion, a substantially cylindrical tank supported at one end upon said arm and between said saddle-shaped portion of the axle and said upwardly projecting portion of said arm and resting in said saddle-shaped portion and said saddle member, a relatively rigid conduit disposed longitudinally of said tank and having connection at its upper end with said tank, a transversely extending conduit connected with the lower end of the first said conduit, a plurality of spray heads carried by the second said conduit, the second said conduit being supported on said curved tines with one of said spray heads therebetween, and means associated with said saddle member for securing the upper end of the first said conduit.

5. In a wheeled vehicle of the character described, a relatively fixed axle comprising an integral and continuous length of metal shaped to provide a wheel spindle at each end and in M-shape as respects its length portion between said spindles and with its central portion concaved, an upwardly extending rod having a handle portion at its upper end and connected adjacent to its lower end with said axle substantially at the center of the concaved portion of the M between said spindles, a supporting arm secured to and projecting outwardly away from said lower end of said rod substantially at right angles to said spindles and to said rod, the center concaved portion of the M providing a saddle above said arm, a second concaved saddle carried by said rod at a place spaced above said axle, said saddles being oriented in the same direction and conforming substantially to the curved portions of a cylindrical object to be supported thereby, and means carried by said rod for securing an object disposed in said saddles and supported by said arm.

ROBERT C. HUDSON.

References Cited in the file of this patent

UNITED STATES PATENTS

| Number | Name | Date |
|---|---|---|
| 640,118 | Eck | Dec. 26, 1899 |
| 900,058 | Connor | Sept. 29, 1908 |
| 1,517,901 | Gill | Dec. 2, 1924 |
| 1,713,095 | Scheffler | May 14, 1929 |
| 1,915,124 | Ernst | June 20, 1933 |
| 1,955,463 | Lathrop | Apr. 17, 1934 |
| 2,071,889 | McGlynn | Feb. 23, 1937 |
| 2,236,053 | Caron | Mar. 25, 1941 |
| 2,275,302 | Magnuson | Mar. 3, 1942 |
| 2,405,862 | Toomey | Aug. 16, 1946 |
| 2,491,818 | Lapp | Dec. 20, 1949 |